United States Patent [19]

Hamatani et al.

[11] Patent Number: 4,475,763
[45] Date of Patent: Oct. 9, 1984

[54] REAR SEAT ARRANGEMENT FOR MOTOR VEHICLE AND THE LIKE

[75] Inventors: Teruo Hamatani; Kiyomi Okino, both of Hiroshima, Japan

[73] Assignee: Toyo Kogyo Co., Ltd., Hiroshima, Japan

[21] Appl. No.: 387,213

[22] Filed: Jun. 10, 1982

[30] Foreign Application Priority Data

Jun. 11, 1981 [JP] Japan ................................. 56-90634

[51] Int. Cl.³ ............................................. B60R 21/10
[52] U.S. Cl. .................................... 296/65 R; 296/69; 297/378
[58] Field of Search ................... 296/65 R, 69, 63, 67; 297/378, 379, 331

[56] References Cited

U.S. PATENT DOCUMENTS

| 2,075,449 | 3/1937 | McMahon | 296/65 R X |
| 2,152,505 | 3/1939 | Stuart et al. | 296/65 R |
| 2,647,788 | 8/1953 | Kaiser et al. | 296/65 R X |
| 2,710,769 | 6/1955 | Rosenthal | 296/65 R X |
| 4,133,556 | 1/1979 | Glinski | 296/65 R X |
| 4,273,376 | 6/1981 | Duguet et al. | 296/65 R |

FOREIGN PATENT DOCUMENTS 352582  4/1961  Switzerland ........................ 296/69

Primary Examiner—Robert B. Reeves
Assistant Examiner—Russell D. Stormer
Attorney, Agent, or Firm—Burns, Doane, Swecker and Mathis

[57] ABSTRACT

The disclosure is directed to an improved rear seat arrangement for use in a motor vehicle and the like in which a seat cushion and a corresponding seat back are simultaneously divided laterally into two portions, respectively capable of being altered in their positions independently of each other so as to meet such a demand as for further carrying persons in addition to loading of long length items, etc. on the motor vehicle.

6 Claims, 5 Drawing Figures

1

REAR SEAT ARRANGEMENT FOR MOTOR VEHICLE AND THE LIKE

BACKGROUND OF THE INVENTION

The present invention generally relates to a rear seat arrangement for use in a motor vehicle or the like, especially in delivery vans and passenger cars of hatch-back type, etc.

As a rear seat arrangement of the above described type, there has conventionally been proposed, for example, in Japanese Laid Open Utility Model Publication Jikkosho No. 56/4513, an arrangement in which the lower portion at a forward edge of a seat cushion is pivotally supported on a seat floor surface of a vehicle body, while the lower portion of a seat back is coupled to the seat floor surface through a double hinge connection, so that when the motor vehicle is to be loaded with a large amount of loads, the seat cushion is rotated forwards for erection about the lower portion at its front edge, and by folding down the seat back into a space formed in the seat floor surface by the displacement of said seat cushion, the back face of the seat back is held generally flush with a load carrying platform located behind the rear seat arrangement for expansion of accommodation area for said platform.

However, in the known arrangement as described above, since the respective seat back and seat cushion are connected in series laterally into one unit, the whole rear seat must be simultaneously altered in its position for expansion of the load carrying platform, and thus, it has been impossible to meet the requirements for further permitting a person to sit on the rear seat, in addition to loading, for example, of a small amount of long length items, etc. on the vehicle.

In order to satisfy the requirements as described above, there may be considered an arrangement in which the seat back for the rear seat is laterally divided into two portions, which are adapted to be inclined independently of each other. In the above case, however, although change-over to a position where one of the seat back portions either at the left or right side of the motor vehicle is folded onto the upper surface of the seat cushion held horizontal, may be readily effected, the whole seat cushion still has to be rotated for erection after all so as to fold the seat back down to such a position where the back surface of said seat back becomes flush with the surface of the load carrying platform, and therefore, the above arrangement does not provide a solution fully satisfactory with respect to the requirements as described earlier, either.

SUMMARY OF THE INVENTION

Accordingly, an essential object of the present invention is to provide an improved rear seat arrangement for use in a motor vehicle and the like in which a seat cushion and a corresponding seat back are simultaneously divided laterally into two portions, respectively capable of being altered in their positions independently of each other so as to fully meet such a demand as for further carrying persons in addition to loading of long-length items, etc. on the motor vehicle.

Another important object of the present invention is to provide an improved rear seat arrangement of the above described type which is simple in construction and reliable in functioning, and can be readily incorporated into a motor vehicle and the like at low cost.

In accomplishing these and other objects, according to one preferred embodiment of the present invention, there is provided a rear seat arrangement for use in a motor vehicle and the like which comprises a first seat and a second seat provided at a left side and a right side of the motor vehicle by dividing a seat cushion member and a seat back member into corresponding two portions for the first and second seats. Each of the first and second seats further includes a seat cushion portion pivotally connected at its forward lower portion, to a seat floor surface so as to be rotated, for being erected at a forward position of the seat, about the pivotal connection at the forward lower portion, and a seat back portion having first rotary shafts provided at its lower portion in a position higher than a surface of a load carrying platform at a rear portion of the seat, and pivotally connected to the seat floor surface so as to be rotatable for inclination in the forward direction through connecting members for guiding the first rotary shafts to a position lower than the surface of the load carrying platform. The divided first and second seats are respectively arranged to be independently changed over to an ordinary position in which the seat cushion portion is held horizontal, with the seat back portion held in an erect state, so that the seat cushion portion and seat back portion for one of the divided first and second seats may form the same continuous plane with respect to the seat cushion portion and seat back portion for the other corresponding one of the first and second seats, and to a first folded position in which the seat back portion is folded upon the upper surface of the seat cushion portion through rotation of the seat back portion about the first rotary shafts for its inclination in the forward direction, and also, to a second folded position in which the seat cushion portion is erected through rotation thereof about the pivotal connection, with the seat back portion being folded into a recess formed in the seat floor surface by the erection of the seat cushion portion, through rotation of the seat back portion about the first rotary shafts thereof displaced in a position lower than the surface of the load carrying platform.

By the arrangement according to the present invention as described above, an improved rear seat arrangement for use in a motor vehicle or the like has been advantageously presented, with substantial elimination of disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
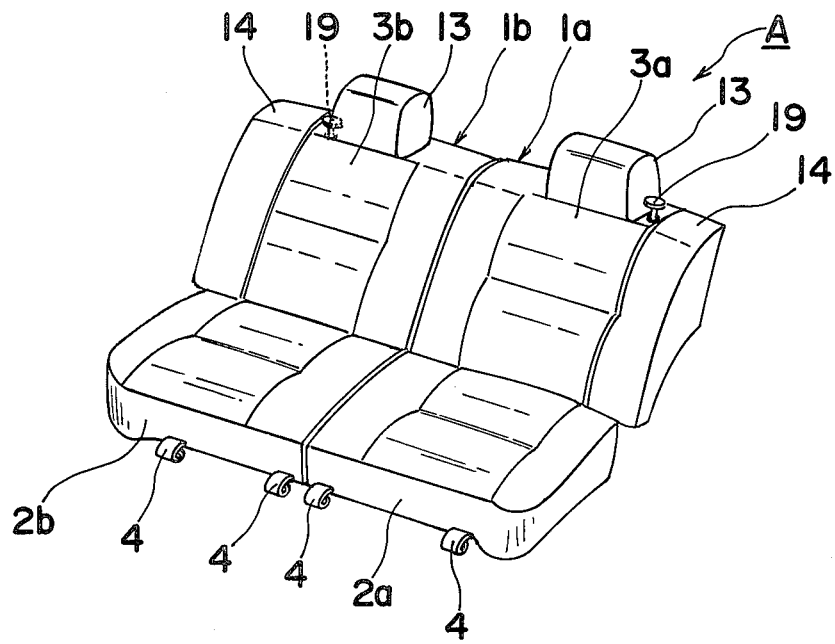
FIG. 1 is a perspective view of a rear seat arrangement according to one preferred embodiment of the present invention held in an ordinary position.

Before the description of the present invention proceeds, it is to be noted that like parts are designated by like reference numerals throughout the accompanying drawings.

Figure 2:
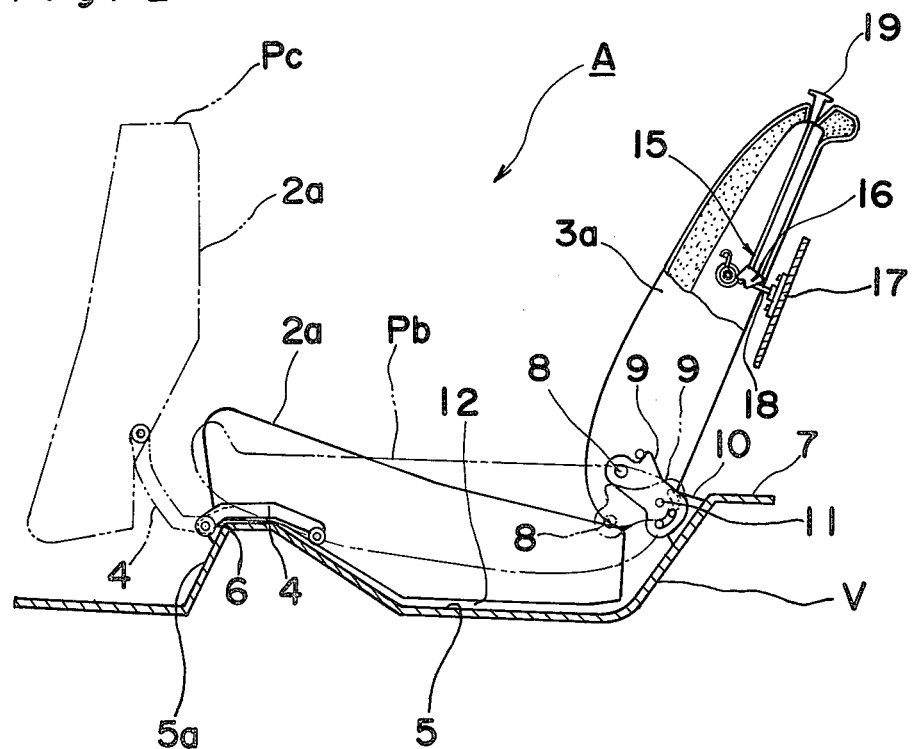
FIG. 2 is a side sectional view showing on an enlarged scale, the construction of the rear seat arrangement of FIG. 1.

Referring now to the drawings, there is shown in FIGS. 1 and 2 a rear seat arrangement A for use in a motor vehicle and the like according to one preferred embodiment of the present invention. The rear seat arrangement A generally includes a pair of divided seats 1a and 1b laterally arranged at right and left sides thereof so as to positionally correspond to each other in an ordinary position as shown in FIG. 1. The divided seats 1a and 1b are respectively provided with seat cushion portions 2a and 2b having approximately the same width and displaceably disposed in a space or recess 12 formed in a seat floor surface 5 of a vehicle body V between a raised portion 5a thereof and a load carrying platform 7 (FIG. 2), and corresponding seat back portions 3a and 3b also of approximately the same width each having detachable head rests 13 at the upper portions thereof and displaceably disposed to extend upwardly from the rear portions of the respective seat cushion portions 2a and 2b, with the rear ends of the seat cushion portions 2a and 2b being held in contact with the corresponding lower ends of said seat back portions 3a and 3b in a manner as described in detail later. In an ordinary position of FIG. 1, cushion members or side seat back portions 14 fixed to vehicle side walls or rear suspension towers 17 (FIGS. 2 to 5) are disposed between the left and right sides of the seat back portions 3a and 3b and corresponding inner walls W of the motor vehicle (not shown). Moreover, as shown in FIG. 2, for locking the respective seat back portions 3a and 3b in the ordinary position of FIG. 1, there is provided a locking device 15 for each of said seat back portions 3a and 3b, which includes a fork member 16 having at its one end, a knob 19 extending out of the upper portion of each of the seat back portions 3a and 3b in a position adjacent to the head rest 13 thereof, and rotatably supported by a frame (not shown) of said seat back portion, and a striker member 18 secured to the vehicle side wall or rear suspension tower 17 for engagement with the corresponding end of the fork member 16 in the ordinary position of FIG. 1. The fork member 16 may be disengaged from the striker member 18 upon pulling up of the knob 19 referred to above. More specifically, each of the rear suspension towers 17 is arranged to project inwardly from the inner wall W of the vehicle, and the striker member 18 and the side seat back portion 14 are fixed to a front surface of said rear suspension tower 17 as is most clearly seen in FIGS. 3 to 5 to be described later.

Still referring to FIGS. 1 and 2, link arm members 4 are pivotally connected, each at one end thereof, to opposite sides at the forward undersurface of each of said seat cushion portions 2a and 2b, while the other ends of the respective link arm members 4 are also pivotally connected, through brackets 6, to the raised portion 5a of the seat floor surface 5, in positions corresponding to the lower undersurfaces at the forward ends of said seat cushion portions 2a and 2b. Accordingly, the seat cushion portions 2a and 2b may be raised or erected as shown in imaginary lines Pc in FIG. 2, through forward or counterclockwise rotation thereof about the pivotal connections at the brackets 6 in the forward undersurfaces of said seat cushion portions 2a and 2b, after withdrawal thereof in the forward direction (i.e. towards the left side in FIG. 2) with their forward portions being raised upwardly.

On the other hand, each of the seat back portions 3a and 3b is provided with shafts 8 extending laterally outwardly from its lower opposite sides in a position higher than the surface of the load carrying platform 7 arranged to be raised above the seat floor surface 5 at the rear portion of said seat floor surface 5, and a connecting member 9 is pivotally supported, at its one end, to each of said shafts 8, while the other end of each of said connecting members 9 is also pivotally connected, through a pivot pin 11, to a bracket 10 secured to the seat floor surface 5 at a position in the vicinity of a boundary line with respect to the surface of the load carrying platform 7 in such a manner that the connecting members 9 may be rotated through a predetermined angle with respect to said brackets 10. Each of the connecting members 9 has, at its lower portion, an elongated arcuate opening formed about the pivot pin 11 as a center, and in said arcuate opening, there is received a pin fixed to the bracket, so that the rotational angle of the connecting member 9 is set by the contact of the pin with the opposite ends of said arcuate opening. Each of the connecting members 9 is formed, at its upper portion, with a contact portion which engages a pin provided on the seat back for restricting the rearward pivotal movement of said seat back. Accordingly, by guiding the respective pivotally shafts 8 of the seat back portions 3a and 3b into a position lower than the surface of the load carrying platform 7 through the connecting members 9 by the forward inclination of the seat back portions 3a and 3b as shown in imaginary lines Pb in FIG. 2, the back surfaces of said seat back portions 3a and 3b may be brought into a position where said back surfaces are generally in the same plane as or flush with the surface of the load carrying platform 7.

Therefore, the respective divided seats 1a and 1b at the left and right sides of the rear seat arrangement A may be independently changed-over into following three positions.

(i) an ordinary position as shown in FIG. 1, in which the seat cushion portions 2a and 2b are held horizontal, with the seat back portions 3a and 3b being erected, so that said seat cushion portions 2a and 2b and seat back portions 3a and 3b may respectively form continuous flat surfaces between said corresponding portions 2a and 2b and also between said corresponding portions 3a and 3b for the divided seats 1a and 1b.

Figure 3:
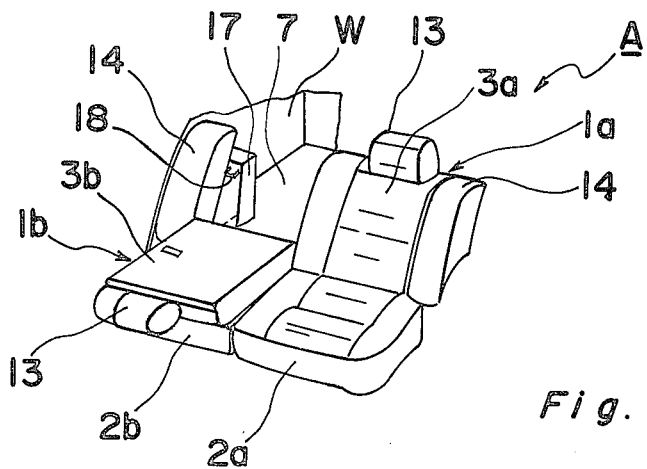
FIG. 3 is a perspective view of the rear seat arrangement of FIG. 1, in which a divided seat at the right side (i.e. at the left side in FIG. 3) is in a first folded position.

(ii) a first folded position as shown in FIG. 3 in which either one or both of the seat back portions 3a and 3b are inclined forwards through rotation about the shafts 8 (the position of the shafts 8 being higher than the load carrying platform surface) thereof so as to be folded onto the surfaces of the seat cushion portions 2a and 2b (in FIG. 3, only the seat back portion 3b is shown to be in the first folded position).

Figure 4:
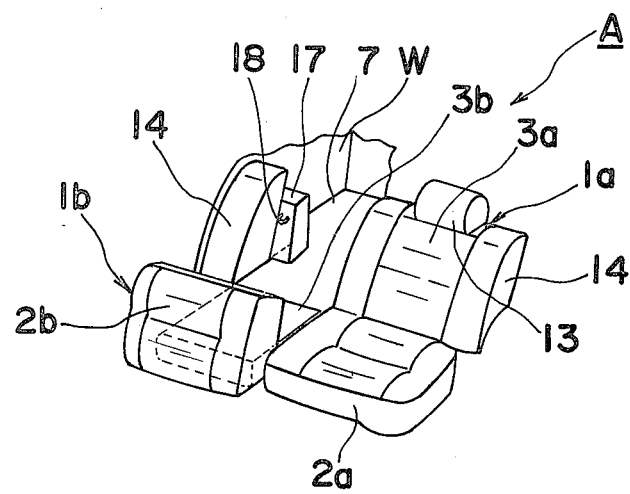
FIG. 4 is a view similar to FIG. 3, which particularly shows the divided seat at the right side is in a second folded position.
Figure 5:
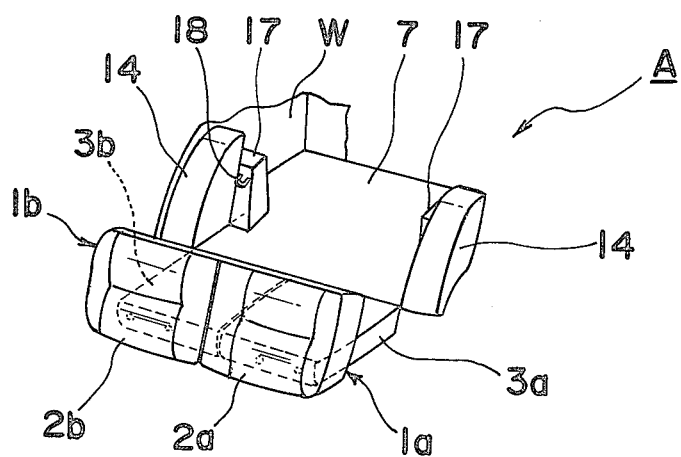
FIG. 5 is a view similar to FIG. 3, which particularly shows the divided seats at the right and left sides are both in the second folded position.

(iii) a second folded position as shown in FIGS. 4 and 5, in which either one or both of the seat cushion portions 2a and 2b are rotated about the pivotal connections at the forward lower portions thereof for erection at the forward portion of the rear seat arrangement, while the seat back portions 3a and 3b are folded into the recess or space 12 (i.e. the portion where the seat cushion portions 2a and 2b are positioned in the ordinary position described above with reference to FIG. 1) formed in the seat floor surface 5 by the above displacement of the seat cushion portions 2a and 2b, through rotation of said seat back portions 3a and 3b about the shafts 8 thereof which are moved to a position lower than the surface of the load carrying platform 7. By the downward pivotal movement of the connecting member 9 about the pivot pin 11 (second pivotal point), the first pivot 8 is displaced to a position lower than the surface of the load carrying platform 7.

By the above arrangement, when the divided seats 1a and 1b at the left and right sides of the rear seat arrangement A are both set at the ordinary position as shown in FIG. 1, the seat cushion portions 2a and 2b and the seat back portions 3a and 3b respectively form continuous flat surfaces for accepting passengers fully up to the seating capacity of the rear seat arrangement A (for example, three persons).

From the above state, upon change-over to the first folded position as shown in FIG. 3 by releasing the locking device 15 for only one side of the divided seats 1a and 1b (i.e. only the divided seat 1b in FIG. 3). The seat back portion 3b is pivoted about the first pivot 8 located at a position higher than the surface of the load carrying platform 7, and is folded onto the upper surface of the seat cushion portion 2b. The back surface of the seat back portion 3b for the divided seat 1b thus changed over to said first folded position is joined with the surface of the load carrying platform 7 in a stepper manner, and thus, long-length items, etc. comparatively light in weight may be placed so as to extend from the surface of the load carrying platform 7 to the back surface of said seat back 3b for the divided seat 1b held in the first folded position while simultaneously, the remaining divided seat 1a allows a person or persons to sit thereon.

Meanwhile, when both of the divided seats 1a and 1b are altered to the first folded position, the capacity for accommodating loads may be increased so as to make it possible to receive a larger amount of goods, although persons are not acceptable in this case.

On the other hand, in the case where only one seat 1b of the divided seats 1a and 1b is changed over from the ordinary position at which both of the divided seats 1a and 1b are aligned as shown in FIG. 1 to the second folded position in the manner as described earlier by removing the head rest 13 for the seat back 3b, the back surface of the seat back 3b for the divided seat 1b brought to said second folded position is joined with the surface of the load carrying platform 7 in a plane generally flush with the latter, and therefore, comparatively heavy and long-length articles, etc. may be loaded so as to extend from the surface of the load carrying platform 7 to the back surface of the seat back portion 3b for the divided seat 1b which is located in said second folded position, while a person or persons may be received in the remaining other divided seat 1a as shown in FIG. 4.

It should be noted here that, although not particularly shown, the distance between the divided seat 1a (or 1b) in the ordinary position and a seat (not shown) located in front of said divided seat is maintained to be large as in the normal state, and therefore, the sliding amount of said front seat may be kept sufficiently large with respect to said divided seat, without any sense of restriction to a person sitting on the front seat.

Furthermore, upon changing-over of both of the divided seats 1a and 1b to the second folded position as shown in FIG. 5, the back surfaces of the seat back portions 3a and 3b for the divided seats 1a and 1b are joined with the surface of the load carrying platform 7 in a plane generally flush with each other, and thus, the volume for accommodating loads becomes the maximum so as to make it possible to receive a still larger amount of goods.

In the embodiment of the present invention described so far, since the divided seats 1a and 1b at the left and right sides are arranged to be capable of independently taking various positions, modes for use thereof may be increased up to as many as nine kinds, and thus, diversification of using state can be achieved to suit to demands by users.

As is clear from the foregoing description, since the rear seat arrangement for a motor vehicle and the like according to the present invention is constituted by the pair of divided seats arranged to laterally correspond to each other, and each including the seat cushion portion which is pivotally connected to the seat floor surface at its front lower portion for rotation thereabout so as to be erected at the forward position, and the seat back portion which is connected, at its lower portion, to the seat floor surface through the double-hinge connection, the requirement for simultaneously accommodating persons during the expansion of the load carrying platform may be fully satisfied, while owing to the increased member of combinations for positions which each of the divided seats may take, a variety of using conditions may be provided to meet the needs by the users, with superior effects in the actual applications.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A rear seat arrangement for use in a motor vehicle and the like which comprises a first seat and a second seat provided at a left side and a right side of the motor vehicle by dividing a sheet cushion member and a seat back member into corresponding two portions for said first and second seats, each of said first and second seats further comprising a seat cushion portion pivotally connected at its forward lower portion to a seat floor surface so as to be rotated for being erected at a forward position of said seat, about the pivotal connection at said forward, lower portion, and a seat back portion having a first pivot provided at its lower portion in a position higher than a surface of a load carrying platform at a rear portion of said seat, and pivotally connected to the seat floor surface so as to be rotatable for inclination in the forward direction through connecting members for guiding said first pivot to a position lower than the surface of said load carrying platform, the connecting members are each connected at a first end to the seat back portion and at a second end to the seat floor, respectively, the first end supporting the first pivot and the second end movably supported with respect to the seat floor, the connecting members permitting the first pivot to move from a position higher than the surface of the load carrying platform to a position lower than the surface of the load carrying platform, said divided first and second seats being respectively arranged to be independently changed over to an ordinary position wherein said cushion portion is held horizontal, with said seat back portion held in an erect state, so that the seat cushion portion and the seat back portion for one of said divided first and second seats may form the same continuous plane with respect to the sheet cushion portion and seat back portion for the other corresponding one of said first and second seats, and to a first folded position wherein the seat back portion is folded upon the upper surface of the seat cushion portion through rotation of said seat back portion about said first pivot for inclination thereof in the forward direction when said first pivot is located at a position higher than the surface of said load carrying platform, and also, to a second folded position wherein said seat cushion portion is erected through rotation thereof, about said pivotal connection, with said seat back portion being folded into a recess formed on the seat floor surface by the erection of said seat cushion portion, through rotation of said seat back portion by the movement of the connecting members, the first pivot is displaced to a position lower than the surface of said load carrying platform.

2. A rear seat arrangement as claimed in claim 1, wherein said connecting members are pivotally supported at the first end by the lower portion of said seat back portion through said first pivot, with said second end being pivotally supported by the seat floor surface through a second pivot, said first pivot being located in a position higher than the surface of the load carrying platform and said second pivot lower than the surface of the load carrying platform at ordinary positions of said rear seat arrangement, said connecting members being provided with a first restricting portion for restricting a rearwardly inclining angle of the seat back portion about the first pivot, and a second restricting portion for restricting the rotational angle about the second pivot.

3. A rear seat arrangement as claimed in claim 1, wherein a rear end of said seat cushion portion is held in contact with a lower end of said seat back portion in said ordinary position of said rear seat arrangement.

4. A rear seat arrangement as claimed in claim 3, wherein the forward lower portion of said seat cushion portion is hingedly connected to the seat floor surface through link arm members to provide said pivotal connection thereat.

5. A rear seat arrangement as claimed in claim 1, further including a locking means for locking said seat back portions to a vehicle body in said ordinary position of said rear seat arrangement.

6. A rear seat arrangement as claimed in claim 1, further including side cushion members fixed to a vehicle body in positions on ends of the seat back portions at the left and right sides and inner walls of a vehicle body.

* * * * *